May 6, 1958　　　C. P. LILJENGREN　　　2,833,339
SEAT CONSTRUCTION

Filed June 22, 1955　　　　　　　　　　　3 Sheets-Sheet 1

INVENTOR
CURTIS P. LILJENGREN
BY
ATTORNEY

May 6, 1958
C. P. LILJENGREN
2,833,339
SEAT CONSTRUCTION
Filed June 22, 1955
3 Sheets-Sheet 2
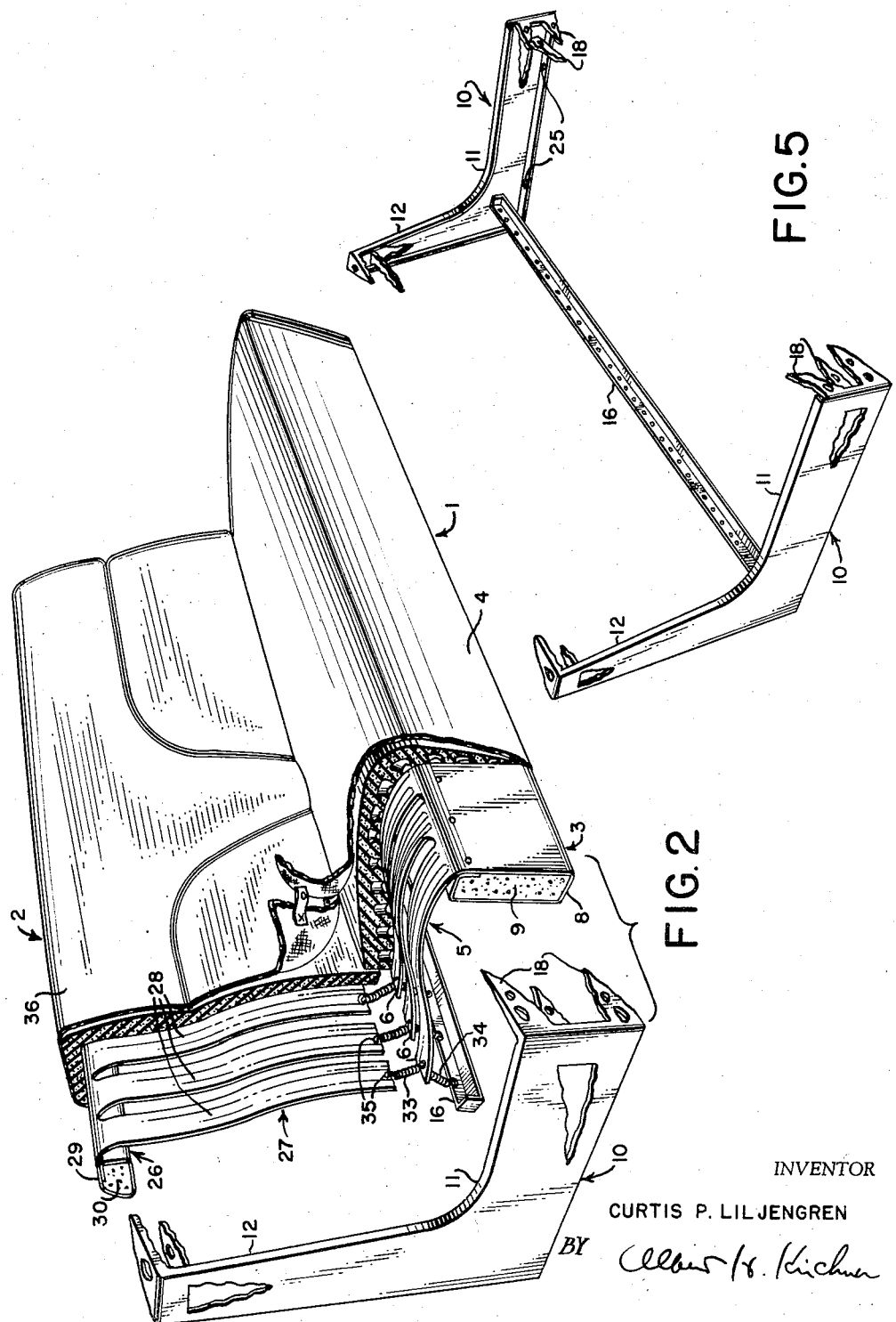
INVENTOR
CURTIS P. LILJENGREN
BY
ATTORNEY May 6, 1958  C. P. LILJENGREN  2,833,339
SEAT CONSTRUCTION
Filed June 22, 1955  3 Sheets-Sheet 3
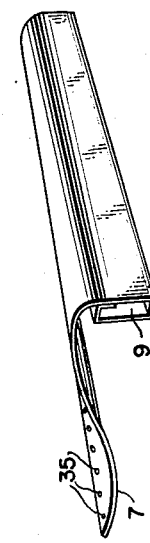
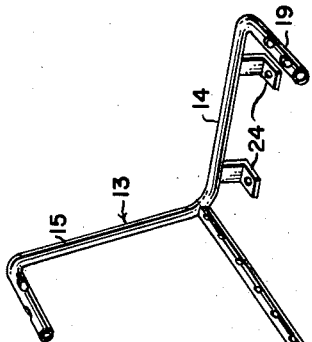
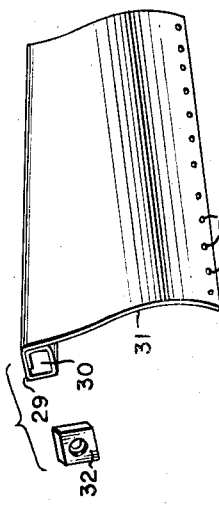
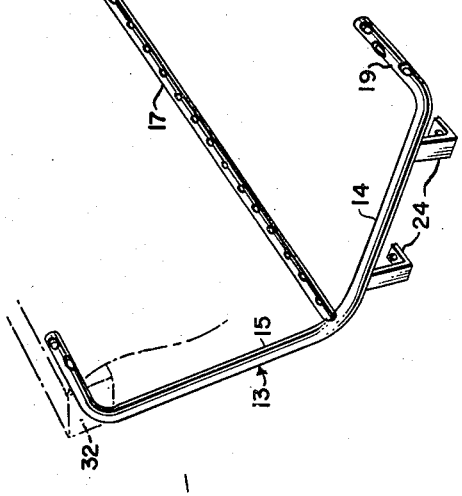
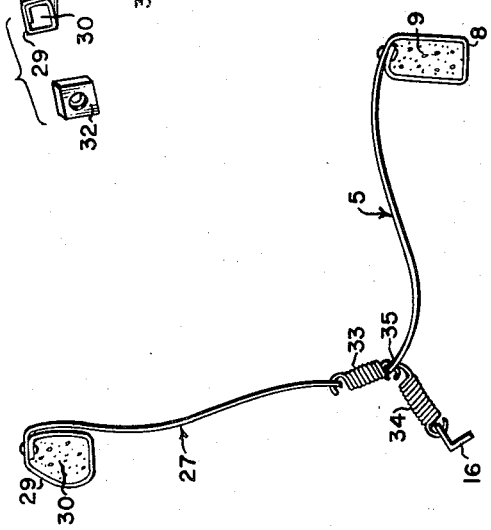
INVENTOR
CURTIS P. LILJENGREN
BY
ATTORNEY

United States Patent Office 2,833,339
Patented May 6, 1958

2,833,339

SEAT CONSTRUCTION

Curtis P. Liljengren, Miami, Fla.; Shirley S. Liljengren, sole legatee of said Curtis P. Liljengren, deceased Application June 22, 1955, Serial No. 517,167

11 Claims. (Cl. 155—179)

The present invention relates to seats and more particularly to the cushion members, both back and bottom, of seat structures especially adapted for use in vehicles, such as automobiles and aircraft.

The principal objects of the invention are to provide a seat of the kind indicated which will be simple and relatively inexpensive in construction, light in weight, and comfortable in a very high degree to occupants throughout a wide range of sizes, weights and posture habits.

Another object is to provide a vehicle seat in which the cushion members are closely associated with transversely extending supporting elements in the form of beams having the necessary structural strength and rigidity and being at the same time yieldable on body impact, as in the case of sudden deceleration resulting from an accident, sufficiently to minimize the likelihood of serious injury to passengers.

A further object is to provide a seat in which the cushion members, both back and bottom, are mounted in supported relation on side frame elements by interfit of projecting portions of the frame elements in beam portions of the cushion members, the projections being secured therein, in a preferred embodiment of the invention, by the setting of a plastic cementitious composition filling the otherwise hollow beams and incidentally materially enhancing the structural strength and rigidity thereof.

Other objects are to simplify the seat structure, lower the tooling, assembling and related manufacturing costs, reduce the thickness of the cushion members and particularly the back member, thus increasing the leg room of occupants of rear seats and/or augmenting the seating capacity of such multiple seat vehicles as passenger aircraft, and providing stout anchorage locations for such appendages as safety belts, safety harness and the like without addition of any structure or expense.

Other objects and advantages will be evident from the disclosure of certain preferred forms of embodiment of the invention as shown in the accompanying drawings, in which Figure 1 is a perspective view of a vehicle type seat constructed in accordance with the principles of the present invention;

Fig. 2 is a perspective view partially expanded and partially broken away, showing some of the interior construction of the seat;

Fig. 5 is a perspective view of an assembly of side frame elements;

Fig. 6 is an end elevational view showing the cushion members (back and bottom) assembled;

Figs. 7 and 8 are perspective views corresponding to Figs. 3 and 4, respectively, but showing modifications;

Fig. 9 is a perspective view corresponding to Fig. 5 but showing a modification; and Fig. 10 is a perspective view showing an alternative form of connection for mounting the cushion members on the side frame members.

Figure 1:
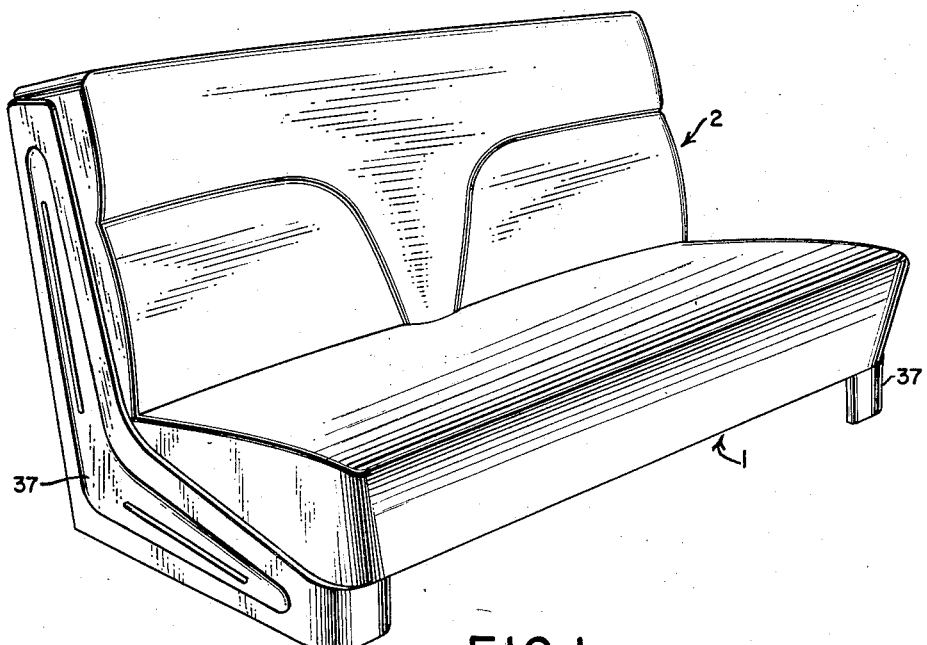
Figure 3:
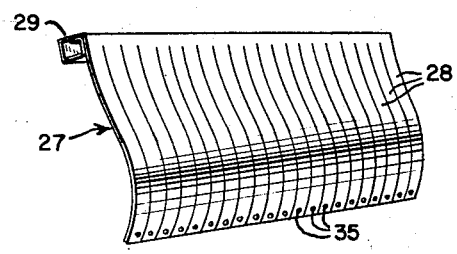
Fig. 3 is a perspective view of a seat back cushion foundation sheet and associated supporting beam.
Figure 4:
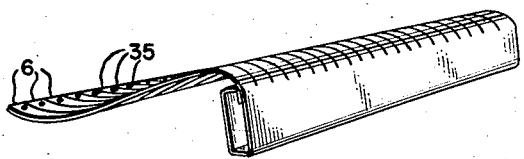
Fig. 4 is a perspective view of a seat bottom cushion foundation sheet and associated supporting beam.

Referring now to these figures, and first to Fig. 1, a preferred embodiment of the invention comprises a seat including essentially a seat bottom 1 and a seat back 2, each of these parts of the assembly constituting a seat cushion member of the special novel construction which forms an important feature of the invention.

The seat cushion member which constitutes the seat bottom 1 comprises an underlying supporting structure 3 and a covering pad 4, the latter serving primarily simply to trim and finish the member and performing only an incidental cushioning function. It is best made of a relatively thin layer of sponge rubber or the like, surfaced with a sheet of conventional upholstery fabric, leather or the equivalent.

It is the underlying supporting structure 3 which provides most of the resiliently yieldable body-contour conforming support which makes the new seat construction remarkably comfortable without requiring the use of thick padding elements. To this end the element 3 of the seat bottom 1 comprises a sheet portion 5 preferably made of resilient sheet metal such as 0.032 inch thick 24 ST aluminum alloy. Such material, and equivalents thereof which could be substituted, is flexible, has high fatigue resistance, is resilient, can be preformed to appropriate curved contour as shown for example in Fig. 2, and will yield from that contour under the weight of an occupant and return to that contour on release of the load.

The sheet portion 5 of the underlying supporting structure 3 is preferably slitted throughout its entire extent, inwardly through and from one edge thereof, to provide a plurality of individually separate side by side substantially parallel strips 6, constituting an assembly like that shown and claimed in my copending patent application Serial No. 391,246, filed November 10, 1953, although within the spirit of the present invention as defined by the broader of the appended claims this sheet portion could be provided in the unslitted form shown at 7 in Fig. 8.

Connected to one edge of the sheet portion 5, preferably being integral therewith, is a beam element 8 of generally tubular shape, constituting a rigid support for the front edge of the seat bottom member. This beam element is best formed by bending the sheet material into overlapping tubular shape and securing the overalpped margin in place by rivets, welding or the like.

When, as is preferred, the beam element 8 is formed integrally of the sheet metal constituting the strips 6 or the unslitted area 7, the material of the tube is generally too thin to provide a beam element of sufficient strength across the full span of a relatively wide seat such as the three or four passenger automobile seat shown in Figs. 1 and 2. The invention nevertheless permits the use of such thin, and consequently economical and lightweight material for the beam element 8 with the additional saving in tooling and assembling costs resulting from the portion 8 being integral with the portion 5 or 7. This is accomplished by stabilizing the tube with a filler 9 such as a foamed-in-place plastic. Among the materials now commercially available which can be successfully used for this purpose is "Lockfoam," type B-605, manufactured by Nopco Chemical Company, of Harrison, N. J. This is a resin in liquid form which in use is mixed with a liquid foaming agent and is applied by pouring into the tube, thereupon foaming and quickly solidifying, adhering tenaciously to the tube walls to form a homogeneous reinforcing filler for the tube. The density of the solidified filler may be controlled by changing the total quantity of material poured into the tube, and/or by varying the ratio of resin to foaming agent.

Another material that can be used as the tube filler is "Styrofoam," polystyrene and methyl chloride type, made by Dow Chemical Company, of Midland, Michigan. Many other similar materials are available, all of them setting up to form a relatively hard porous fill which nevertheless is capable of being locally crushed on sufficient impact.

The filler 9 functions also as a medium for attachment of the beam element 8, and hence the entire cushion member, to a side frame member 10, as shown in Fig. 2. Such a member can be made in any one of a number of optional forms, and may include connected portions 11 and 12 for attachment respectively to the seat bottom member 3 and a seat back member presently to be described. In Fig. 2 the side frame member 10 is shown made of pressed steel sheet, while in Fig. 9 a modified side frame member 13 is shown made of metal tubing having portions 14, 15, corresponding to the portions 11 and 12, respectively, of the form shown in Figs. 2 and 5.

Two side frame members are normally provided and are connected by a cross bar 16 or 17 of appropriate cross section to provide a rigid assembly, and the assembly is connected to the beam element 8, or the beam element is mounted in the assembly, by inserting in the tube of the beam, prior to the introduction of the filler, or at least before the filler has solidified, projections formed on the side members, such as the projections 18 in Fig. 5 or the extensions 19 of Fig. 9. An obviously equivalent type of connection is shown in Fig. 10 and comprises a closure plate member 20 having a projection 21 which is embedded in the filler and is socketed and tapped to receive a bolt or the like 22 for attachment of the side frame member designated 23 in this figure.

The side frame members may be provided with legs 24 as shown in Fig. 9, or they may be bolted directly to the floor as indicated at 25 in Fig. 5.

The seat cushion member constituting the underlying supporting structure 26 of the seat back 2 is made generally like the seat bottom cushion member. It includes a sheet portion 27 preferably slitted into a plurality of strips 28, all integrally connected at one end to a beam element 29 of tubular form reinforced by a body of filler material 30. In the alternative the unslitted sheet 31 of Fig. 7 may be used, as will be understood.

The beam element 29 of the seat back member is mounted on the side frame portions 12 or 15 by the anchoring means shown in Figs. 2 and 9, corresponding to the means heretofore described. When side frames of the tubular form are used it may be found desirable to include a closure plate of the kind shown at 32 in Fig. 7.

The free edge of each of the sheet portions 5 and 27 (or 7 and 31, Figs. 7 and 8) of the seat bottom and back are connected to each other and to the cross bar 16 or 17 by means of a plurality of resilient elements in the form of coil tension springs as best shown in Figs. 2 and 6. In the preferred arrangement, springs 33 connect the back and bottom members together, and similar springs 34 connect the bottom member to the cross bar. When the slitted strip embodiment of the invention is used, a spring 33 connects the end portion of each strip of one of the cushion members to the end portion of the adjacent strip of the other, and a spring 34 connects the end portion of each strip of the bottom member to the cross bar. The cross bar and the strips are provided with a series of perforations 35 into which the springs are hooked.

Like the seat bottom member, the seat back member is surfaced with a covering sheet, designated 36, best made of a relatively thin sheet of foam rubber and a fabric or leather facing.

If desired, the side frame members may be covered by a trimming plate 37 as shown in Fig. 1.

It is believed to be evident from the foregoing that the construction thus provided includes rigid and strong supporting elements in the form of the beam elements that are integral parts of the seat cushion members, or at least are intimately associated therewith by direct fixed connection thereto. Moreover, the seat back member beam element, as has been suggested hereinbefore, is easily constructed, by proper application of the filler material, so as to be locally crushable or deformable on impact, thus tending to reduce personal injury without appreciably reducing the beam strength. Furthermore, the high beam strength provides excellent anchorage for shoulder harness which is now coming into increased usage in automobiles, and the several other advantages hereinbefore referred to are obtained.

The invention is capable of being embodied in other and further modified forms all within the scope and purview of the broader of the appended claims. Moreover, the structures herein disclosed as incorporating the principles of the invention may be embellished by the addition of various conventional and well understood features, among which may be mentioned a back trim panel covering the rear of the sheet portion 27 or 31. In this connection it may be noted that such a panel may be positioned in place quite close to the sheet portion 27 or 31, thus making the whole back structure quite thin and providing an unusually great amount of leg and knee room for the occupant of the next adjacent seat to the rear, and/or permitting longitudinally adjacent seats to be set closer together in the vehicle.

I claim:

1. A seat cushion member having a supporting surface area formed of resilient sheet material and having connected thereto along one edge thereof a beam element comprising a tube of relatively thin material and means strengthening said beam element comprising a porous lightweight solidified plastic filler substantially completely filling said tube.

2. The combination claimed in claim 1, in which the cross-section of the tube is continuous and closed and the tube and supporting surface area are integral portions of a single sheet.

3. The combination claimed in claim 1, in which the supporting surface area is composed of a plurality of strips of sheet material disposed in side by side relation, each strip being integral with the tube.

4. The combination claimed in claim 1, in which the tube and supporting surface area are integral portions of a single sheet and in which the supporting surface area is slitted from the tube through the opposite edge of said area to provide a plurality of strips disposed in side by side relation.

5. The combination claimed in claim 1, including supporting side frame members and means extending therefrom into said tube and anchored in the filler therein for securing the cushion member to said side frame members.

6. The combination claimed in claim 1, including supporting side frame members having laterally protruding portions extending into said tube and anchored in the filler therein.

7. The combination claimed in claim 1, including supporting side frame members having laterally protruding portions extending into said tube and provided with surface areas anchoring the side frame members to said beam by interlocking engagement with the filler therein.

8. A vehicle seat back cushion member as defined by claim 1, in which the supporting surface area is substantially tangential to the tube comprising the beam element and extends generally downwardly therefrom, the tube presenting a curved surface to the rear of the member, and the material of the tube and the filler being appreciably locally yieldable so as to cushion the blow delivered by the body of a person on accidental impact.

9. A seat bottom cushion member as claimed in claim 1, in combination with a fixed frame element extending transversely of the member, with the free edge of the member, opposite the beam element, connected to said frame element by resilient means.

10. A seat back cushion member as claimed in claim 1, in combination with a fixed frame element extending transversely of the member, with the free edge of the member, opposite the beam element, connected to said frame element by resilient means.

11. A seat having back and bottom cushion members each as claimed in claim 1, in combination with a fixed frame element extending transversely of said members, and resilient means connecting the free edge of each of the members, opposite the beam elements thereof, with said fixed frame element.

References Cited in the file of this patent

UNITED STATES PATENTS

| | | |
|---|---|---|
| 2,324,318 | Niedringhaus | July 13, 1943 |
| 2,722,267 | Liljengren | Nov. 1, 1955 |